(12) United States Patent
Wang et al.

(10) Patent No.: US 11,336,629 B2
(45) Date of Patent: May 17, 2022

(54) DETERMINISTIC LOAD BALANCING OF IPSEC PACKET PROCESSING

(71) Applicant: VMWARE, INC., Palo Alto, CA (US)

(72) Inventors: Yong Wang, Palo Alto, CA (US); Awan Kumar Sharma, Pune (IN); Manmeet Khurana, Pune (IN); Shailesh Urhekar, Pune (IN); Sourabh Bhattacharya, Pune (IN)

(73) Assignee: VMWARE, INC., Palo Alto, CA (US)

( * ) Notice: Subject to any disclaimer, the term of this patent is extended or adjusted under 35 U.S.C. 154(b) by 142 days.

(21) Appl. No.: 16/802,580

(22) Filed: Feb. 27, 2020

(65) Prior Publication Data
US 2021/0136049 A1    May 6, 2021

(30) Foreign Application Priority Data
Nov. 5, 2019 (IN) ............................. 201941044901

(51) Int. Cl.
*H04L 29/06* (2006.01)
*H04L 45/74* (2022.01)
*H04L 69/22* (2022.01)

(52) U.S. Cl.
CPC .......... *H04L 63/0485* (2013.01); *H04L 45/74* (2013.01); *H04L 63/029* (2013.01); *H04L 63/0272* (2013.01); *H04L 63/164* (2013.01); *H04L 69/22* (2013.01)

(58) Field of Classification Search
CPC ... H04L 63/0485; H04L 63/164; H04L 45/74; H04L 63/0272; H04L 69/22; H04L 63/029
See application file for complete search history.

(56) References Cited

U.S. PATENT DOCUMENTS

| 10,498,708 | B2 | 12/2019 | Wang et al. |
| 10,623,372 | B2 | 4/2020 | Wang et al. |
| 10,701,107 | B2 | 6/2020 | Wang et al. |
| 2016/0057108 | A1* | 2/2016 | Hu ........................ G06F 21/606 726/15 |
| 2016/0212098 | A1* | 7/2016 | Roch ................... H04L 63/0428 |
| 2017/0063979 | A1* | 3/2017 | Saeki ...................... G06F 13/38 |

(Continued)

OTHER PUBLICATIONS

IEEE: Shin Muramatsu, R.Kawashima, S.SaitoandH.Matsuo, "VSE: Virtual Switch Extension for Adaptive CPU Core Assignment in Softirg," 2014 IEEE 6th International Conference on Cloud Computing Technology and Science, Singapore, 2014, pp. 923-928. doi: 10.1109/CloudCom.2014.68 (Year:2014) (Year: 2014).*

(Continued)

*Primary Examiner* — Lan-Huong Truong
(74) *Attorney, Agent, or Firm* — Patterson & Sheridan, LLP

(57) ABSTRACT

Certain embodiments described herein are generally directed to systems and methods for deterministic load balancing of processing encapsulated encrypted data packets at a destination tunnel endpoint. For example, certain embodiments described herein relate to configuring a destination tunnel endpoint (TEP) with an encapsulating security payload (ESP) receive side scaling (RSS) mode to assign each incoming packet, received from a certain source endpoint (EP), to a certain RSS queue based on an identifier that is encoded in an SPI value included the packet.

18 Claims, 4 Drawing Sheets

(56) References Cited

U.S. PATENT DOCUMENTS

| | | | |
|---|---|---|---|
| 2018/0054458 A1* | 2/2018 | Marck | H04L 63/1458 |
| 2019/0173850 A1 | 6/2019 | Jain et al. | |
| 2019/0173851 A1 | 6/2019 | Jain et al. | |
| 2019/0190892 A1* | 6/2019 | Menachem | H04L 63/164 |
| 2020/0351254 A1* | 11/2020 | Xiong | H04L 63/164 |

OTHER PUBLICATIONS

Kumar, Raju et al., U.S. Appl. No. 16/016,360, filed Jun. 22, 2018.
Wang, Dexiang et al., U.S. Appl. No. 16/893,450, filed Jun. 5, 2020.
Wang, Yong et al., U.S. Appl. No. 16/514,647, filed Jul. 17, 2019.
Yu, Jia et al., U.S. Appl. No. 16/450,026, filed Jun. 24, 2019.
Chandrashekar, Shekhar et al., U.S. Appl. No. 16/906,905, filed Jun. 19, 2020.

* cited by examiner

DETERMINISTIC LOAD BALANCING OF IPSEC PACKET PROCESSING

RELATED APPLICATIONS

Benefit is claimed under 35 U.S.C. 119(a)-(d) to Foreign Application Serial No. 201941044901 filed in India entitled "DETERMINISTIC LOAD BALANCING OF IPSEC PACKET PROCESSING", on Nov. 5, 2019, by VMware, Inc., which is herein incorporated in its entirety by reference for all purposes.

BACKGROUND

IP security protocols are widely used to protect packets communicated between endpoints (EPs), such as over the Internet, between gateways, between data centers (e.g., on premises data centers, cloud data centers, etc.), within data centers, etc. For example, security associations (SAs) may be established between the endpoints. In some embodiments, each security association is a one-way or simplex connection, and therefore at least two security associations, one for each direction, are established between two IPSec peers (e.g., endpoints). These security associations are a form of contract between the endpoints detailing how to exchange and protect information among each other. In some embodiments, each security association is comprised of a mutually agreed-upon key, one or more security protocols, and/or a security parameter index (SPI) value. After security associations have been established between two endpoints, an IPSec protocol may be used to protect data packets for transmission.

For IPSec in the Encapsulating Security Payload (ESP) tunnel mode, tunnel endpoints ("TEPs") are used for applying IPSec protocols to encrypt and encapsulate egress packets from a source endpoint and decrypt and decapsulate ingress packets for a destination endpoint to secure communication between the endpoints. For example, a source endpoint may generate and route egress IP packets to a source TEP associated with the source endpoint. In particular, the source endpoint may generate an IP packet including a header with the IP address of the source endpoint set as the source IP address and the IP address of the destination endpoint set as the destination IP address. A MAC address of the source TEP may further be set as a next-hop MAC address of the IP packet in the header.

The source TEP receives the IP packet and encrypts the original IP packet including the header of the original IP packet based on a security association established between the source TEP and the destination TEP. For example, the source TEP encrypts the original IP packet with a mutually agreed-upon key of the security association. The source TEP further encapsulates the encrypted packet by adding a new IP header and an ESP header (e.g., including an SPI value corresponding to the security association used to encrypt the packet) to the encrypted packet to generate an encapsulated ESP encrypted data packet. The new IP header includes a source IP address of the source TEP and a destination IP address of the destination TEP. The new IP header is used to forward the encapsulated ESP encrypted data packet through a network from the source TEP to the destination TEP.

The destination TEP may then decapsulate and decrypt the encapsulated ESP encrypted data packet to extract the original IP packet. For example, the destination TEP may determine the security association (e.g., mutually agreed-upon key) to use to decrypt the encapsulated ESP encrypted data packet based on the SPI value included in the ESP header. Based on the destination IP address in the header of the original IP packet, the destination TEP forwards the original IP packet to the destination endpoint.

IPSec protocols may be deployed in virtualized computing instances (e.g., a virtual machine (VM) or container) to gain the benefits of virtualization and network functions virtualization (NFV). For example, virtual computing instances may be configured to serve as TEPs as described. However, use of such IPSec protocols by virtualized computing instances may cause certain other features at the virtualized computing instances to function improperly.

In a virtualized environment, virtual network interface controllers (VNICs) are instantiated in a virtualization layer (also referred to herein as the "hypervisor") supporting such virtualized computing instances and are programmed to behave similarly to physical NICs (PNICs). One feature both PNICs and VNICs have supported is receive side scaling (RSS), which involves computing a hash of incoming packet header attributes and distributing the incoming network traffic across CPUs for processing based on the computed hash values. Packets belonging to the same connection are distributed to the same RSS queue, based on the computed hash value, for processing by a particular CPU. For a VNIC, packets are distributed to virtual RSS queues associated with the VNIC based on the computed hash value. The packets in a virtual RSS queue are processed by a particular virtual CPU associated with the virtual RSS queue.

Traditionally, for a VNIC, RSS is performed for IP packets based on a detected packet type indicated by an IP protocol number in an IP header of the packet that indicates the next higher layer protocol being carried as the IP payload. For example, the VNIC may be configured to perform RSS only for packets of type TCP and UDP, corresponding to IP protocol numbers 6 and 17, respectively. However, for packets encapsulated using ESP tunnel mode, the IP protocol number in the new IP header may be 50. Accordingly, the VNIC may not be configured to perform RSS for received encapsulated ESP encrypted data packets based on related information.

Further, the hash computed for selecting a RSS queue is traditionally computed based on the source IP address and destination IP address in the header of the packet. In an encapsulated ESP encrypted data packet, the only available (i.e., non-encrypted) IP addresses for computing the hash are the source IP address of the source TEP and the destination IP address of the destination TEP. Accordingly, at a VNIC of a destination TEP, all encapsulated ESP encrypted data packets received from the same source TEP, regardless of the source endpoint that sent the packet and the destination endpoint, would have the same source IP address and destination IP address in the new IP header, and therefore hash to the same value and be assigned to the same virtual RSS queue. Therefore, in a scenario where there is only one or a few source TEPs, meaning there is only one or a few tunnels, it is unlikely that RSS could be used to distribute processing of such encapsulated ESP encrypted data packets, in a balanced manner, amongst multiple virtual RSS queues and accordingly multiple virtual CPUs.

SUMMARY

Herein described are one or more embodiments of a method for deterministic load balancing of processing encapsulated encrypted data packets at a destination tunnel endpoint. The method includes engaging in a tunnel creation according to a security protocol with a source TEP for encrypting data packets communicated between a source endpoint and a destination endpoint. The method further comprises selecting a CPU from a plurality of CPUs of the destination TEP using a CPU selection function, the selected CPU being selected to process packets communicated over the tunnel from the source TEP to the destination TEP. The method further comprises determining an identifier associated with a receive side scaling (RSS) queue associated with the selected CPU. The method further comprises generating a security parameter index (SPI) value including the identifier. The method further comprises indicating the SPI value to the source TEP. The method further comprises establishing an in-bound security association with the source TEP using the SPI value. The method further comprises receiving an encrypted packet from the source TEP, wherein the encrypted packet is encrypted by the source TEP based on the in-bound security association and the encrypted packet includes the SPI value. The method further comprises processing the encrypted packet using the selected CPU for, based on the SPI value including the identifier.

Also described herein are embodiments of a computer system including a memory comprising executable instructions and a processor in data communication with the memory and configured to execute the instructions to cause the computer system to perform a method described above for deterministic load balancing of processing encapsulated encrypted data packets at a destination tunnel endpoint.

Also described herein are embodiments of a non-transitory computer readable medium comprising instructions to be executed in a computer system, wherein the instructions when executed in the computer system perform the method described above for deterministic load balancing of processing encapsulated encrypted data packets at a destination tunnel endpoint.

DETAILED DESCRIPTION

In some cases, VNICs may be configured to perform RSS for received encapsulated ESP encrypted data packets. For example, the destination tunnel endpoint's VNIC may be configured to compute a hash of incoming packet header attributes, including an SPI value associated with each packet, and distribute the incoming network traffic across CPUs for processing based on the computed hash values. However, even in such cases, unless there is a very large number (e.g., thousands) of IPSec tunnels (e.g., such that there are many different combinations of source and destination tunnel endpoint IP addresses) or many different security associations (e.g., such that there are many different SPI values, in cases where there is a single IPSec tunnel), it is very unlikely that the RSS performed by the VNIC results in a statistically uniform distribution of packets to virtual CPUs.

Accordingly, embodiments presented herein relate to systems and methods for deterministic load balancing of processing encapsulated encrypted data packets at a destination tunnel endpoint. For example, certain embodiments described herein relate to configuring a destination tunnel endpoint (TEP) with an encapsulating security payload (ESP) receive side scaling (RSS) mode to assign each incoming packet, received from a certain source endpoint (EP), to a certain RSS queue based on an identifier that is encoded in an SPI value included the packet. As described below, the identifier may be indicated by a certain number of bits in the SPI values. The identifier may identify an RSS queue number associated with an RSS queue associated with a certain virtual CPU at the destination TEP. When received by the destination TEP, an incoming encapsulated ESP encrypted packet is examined by the destination TEP to determine which RSS queue the packet should be assigned to based on the identifier in the SPI value. The identifier may be encoded in the SPI value during IPSec tunnel creation performed by the destination and source TEPs. The selection of an identifier is based on a selection of a virtual CPU. A virtual CPU is selected by the destination TEP from the plurality of virtual CPUs based on a CPU selection function. One of a variety of CPU selection functions may be used to help ensure that incoming network traffic from different source EPs, through the source TEP, is evenly distributed among virtual CPUs at the destination TEP.

Figure 1:
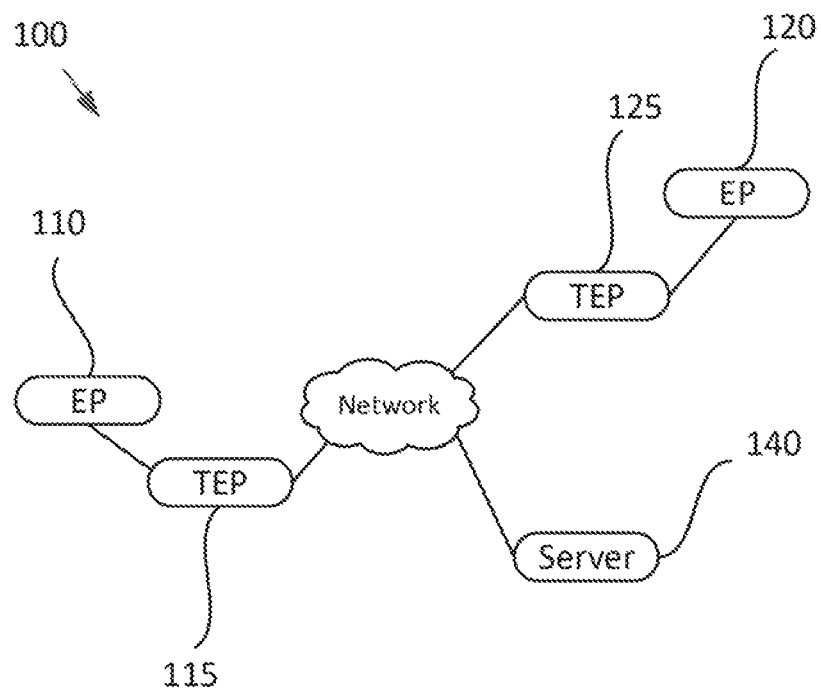
FIG. 1 illustrates an example of a network, in accordance to some embodiments.

FIG. 1 illustrates an example of a network 100, representing a physical network. As shown by FIG. 1, network 100 connects a plurality of tunnel endpoints (TEPs), including TEP 115 and TEP 125, and a server 140. A TEP may be a physical computing device (e.g., physical server, physical host). In certain embodiments, a TEP may be a virtualized computing instance (e.g., virtual machine, container, data compute node, isolated user space instance, etc.) as further discussed herein. A TEP may also be referred to as an IPSec gateway and should not be confused with a Virtual Extensible Local Area Network (VXLAN) Tunnel Endpoint (VTEP).

TEPs 115 and 125 may connect endpoints (EPs), including EP 110 and EP 120, for example, to stretch a network across geographically distant sites. An EP refers generally to an originating EP ("source EP") or terminating EP ("destination EP") of a flow of network packets, which can include one or more data packets passed from the source to the destination EP. In practice, an EP may be a physical computing device (e.g., physical server, physical host). In certain embodiments, an EP may be a virtualized computing instance (e.g., virtual machine, container, data compute node, isolated user space instance) as further discussed herein.

In network 100, EPs may communicate with or transmit data packets to other EPs via tunnel endpoints (TEPs) as discussed. EP 110 may transmit a data packet to EP 120 in a secured fashion via TEPs 115 and 125, acting as a source TEP and a destination TEP, respectively. TEPs 115 and 125 may implement IPSec protocols, including ESP tunnel mode, to secure communication between one another. In some embodiments, before any data can be securely transferred between EPs 110 and 120 using the IPSec framework, security associations (e.g., including a mutually agreed-upon key, one or more security protocols, and/or a SPI value) may need to be established between TEPs 115 and 125. In some embodiments, the security associations may be established by TEPs 115 and 125 on behalf of EPs 110 and 120.

The mutually agreed-upon key (e.g., encryption/decryption key), in some embodiments, is generated by a server (e.g., server 140) and subsequently distributed to TEPs 115 and 125 associated with the EPs 110 and 120. The one or more security protocols, described above, may be one or more IPSec security protocols such as Authentication Header (AH), Encapsulating Security Payload (ESP), etc. After security associations have been established for the two EPs 110 and 120, one or more of these security protocols may be used to protect data packets for transmission. Though certain embodiments are described herein with respect to the ESP security protocol, other suitable IPSec security protocols (e.g., AH protocol) alone or in combination with ESP, may be used in accordance with the embodiments described herein. Further, the embodiments described herein may similarly be used for different types of traffic such as IPv4, IPv6, etc. In certain embodiments, the techniques herein can be used to hash ESP packets encapsulated in other packet types (e.g., VXLAN or Geneve).

In addition to a mutually agreed-upon key and security protocol, a security association includes an SPI value. In some embodiments, each SPI value is a binary value associated with a security association, which enables a TEP to distinguish among multiple active security associations. As an example, SPI values may be used to distinguish between the inbound and outbound security associations of different EPs. In some cases, the Internet Key Exchange (IKE) protocol is used to generate these SPI values and encryption/decryption keys in the IPSec framework. For example, prior to any data exchange, IKE performs a two-phase negotiation session, which results in establishing two security associations between two IPSec peers (e.g., TEPs). These security associations may not only contain mutually agreed-upon encryption and decryption keys to be used for incoming and outgoing traffic (e.g., of an EP), but also maintain sequence numbers for each data transfer. These sequence numbers are maintained to ensure anti-replay, which prevents hackers from injecting or making changes in data packets that travel from a source to a destination TEP.

In some cases, instead of using IKE, distributed network encryption (DNE) may be utilized to simplify key management, including key generation and exchange, and SPI allocation. DNE provides a central unit, e.g. server 140, that generates and distributes encryption/decryption keys and SPI values for EPs to TEPs in a network. DNE also simplifies protecting network traffic of TEPs by allowing users (e.g., network administrators) to define simple security rules and key policies. For example, in some embodiments, server 140 may store, in its memory, a plurality of security rules and key policies. Security rules may be user-defined rules that users input into the central unit through an interface (e.g., via a manager, which may be a physical computing device or a virtualized computing instance supported by a physical computing device). Security rules may define what key policy is used by server 140 to generate an encryption/decryption key for data transfer between TEPs for EPs in a network. In some embodiments, each key policy may be associated with one or more EPs and include certain specifications (e.g., one or more of an algorithm, action, strength of the key, etc.) that define properties of an encryption/decryption key.

Figure 2:
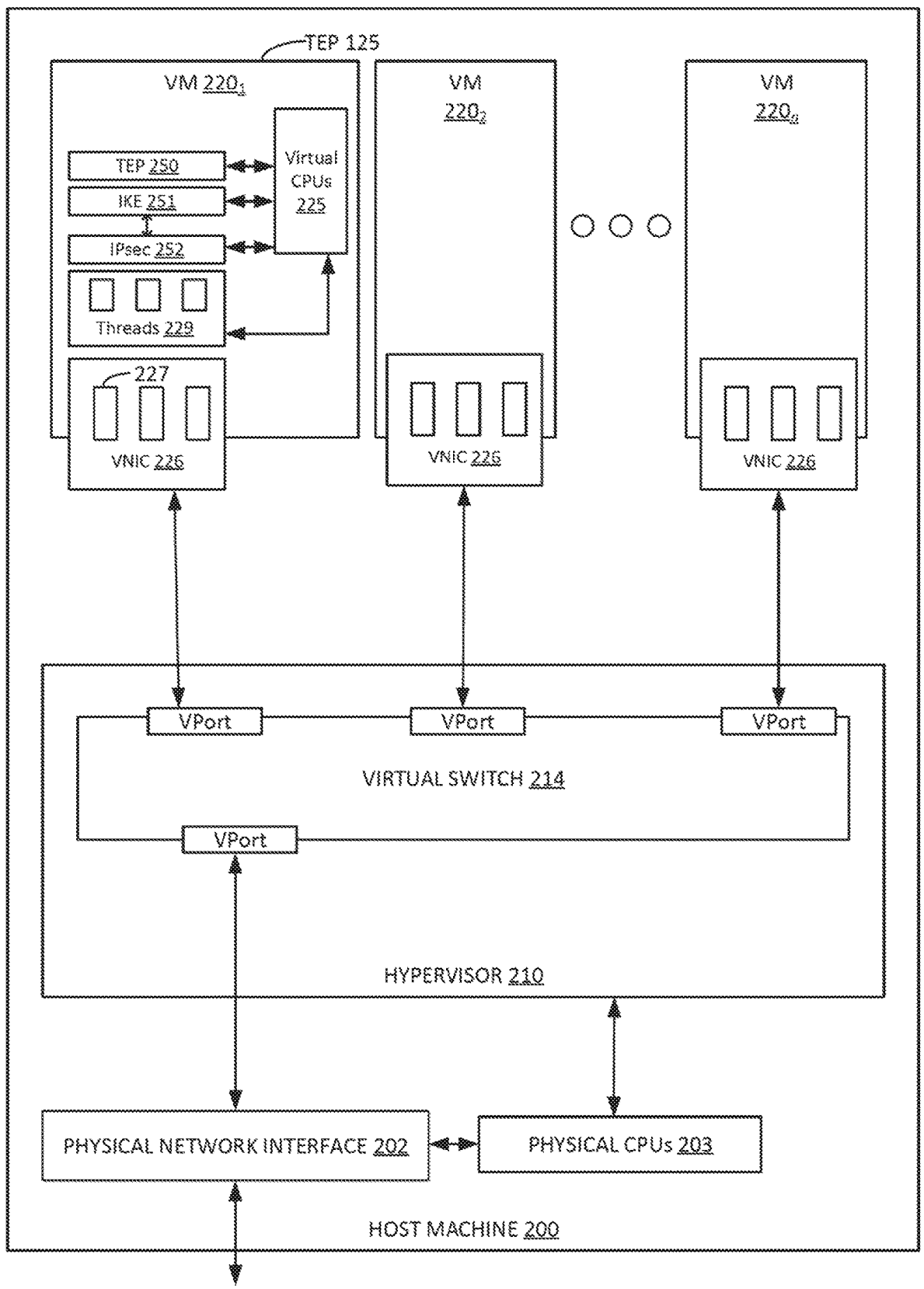
FIG. 2 illustrates an example block diagram of host machine for use in a virtualized network environment, according to some embodiments.

FIG. 2 illustrates an example block diagram of host machine 200 for use in a virtualized network environment, according to some embodiments. As illustrated, host machine 200 includes a physical network interface controller (PNIC) 202, a hypervisor 210, and a plurality of virtual machines $220_1$, $220_2$, . . . $220_n$.

Host machine 200 may provide part of the computing infrastructure in a virtualized computing environment distributed among multiple host machines. Though certain embodiments are described herein with respect to VMs, the same principals and techniques may also apply to other appropriate virtual computing instances (e.g., virtual machine, container, data compute node, isolated user space instance) or physical computing devices. In certain embodiments, host machine 200 is a physical general purpose computer (e.g., a server, workstation, etc.) and includes one or more physical central processing units (CPUs) 203. Although not shown, in addition to physical CPUs 203, host machine 200 may also include a system memory, and non-volatile data storage, in addition to one or more physical network interfaces, such as PNIC 202, for communicating with other hardware computing platforms, entities, or host machines on a physical network accessible through PNIC 202.

Hypervisor 210 serves as an interface between virtual machines 220 and PNIC 202, as well as other physical resources (including physical CPUs 203) available on host machine 200. Each VM 220 is shown including a virtual network interface card (VNIC) 226, which is responsible for exchanging packets between VM 220 and hypervisor 210. Though shown as included in VMs 220, it should be understood that VNICs 226 may be implemented by code, such as VM monitor (VMM) code, associated with hypervisor 210. VMM code is part of host code that is provided as part of hypervisor 210, meaning that a VNIC 226 is not executed by VM 220's code, also referred to as guest code. VNICs 226 may be, in some cases, a software implementation of a physical network interface card. Each VM 220 is connected to a virtual port (vport) provided by virtual switch 214 through the VM's associated VNIC 226. Virtual switch 214 may serve as physical network switch, i.e., serve as an edge device on the physical network, but implemented in software. Virtual switch 214 is connected to PNIC 202 to allow network traffic to be exchanged between VMs 220 executing on host machine 200 and destinations on an external physical network.

In certain embodiments, each VNIC 226 may be configured to perform RSS. Accordingly, each VNIC 226 may be associated with a plurality of software based VNIC RSS queues 227 on VM 220. Each of the VNIC RSS queues 227 represents a memory space and may be associated with a certain virtual CPU (e.g., a different virtual CPU) from one or more virtual CPUs 225. As described in U.S. Patent Application Publication 2016/0085571, which is incorporated herein by reference, a virtual CPU may correspond to different resources (e.g., physical CPU or execution core, time slots, compute cycles, etc.) of one or more physical CPUs 203 of host machine 200. When receiving incoming packets (e.g., not including encapsulated ESP encrypted packets), VNIC 226 may compute a hash value based on header attributes of the incoming packets and distribute the incoming packets among the VNIC RSS queues 227 associated with VNIC 226. For example, different hash values may be mapped to different VNIC RSS queues 227. Each VM 220 spawns threads 229 that are responsible for accessing incoming packets stored in RSS queues 227 and causing one or more actions (e.g., forwarding, routing, etc.) to be executed by a virtual CPU 225 on the packet.

As an example, a thread 229 may access a packet stored in an RSS queue 227 that corresponds to a certain virtual CPU 225. This certain virtual CPU 225 is then used to execute a variety of actions on the packet. Threads 229 may access the incoming packets either through polling RSS queues 227 or receiving interrupt events. Threads 229 may be configured to handle the incoming packets using a pipeline mode (e.g., multiple threads are each responsible for a different action that is performed on the packet) or a run-to-completion mode (e.g., a single thread is responsible for taking packets, one at a time, from a certain RSS queue 227 and causing a variety of actions to be performed on the packet, from start to finish).

Once a thread 229 that is scheduled on a virtual CPU 225 accesses a packet for processing, the virtual CPU 225 begins running an interrupt handler invoked by the kernel in response to an interrupt issued by VNIC 226. The virtual CPU 225 then continues with further processing the packet by performing protocol processing (unless another virtual CPU is selected, by a higher level packet steering module (e.g., Receive Packet Steering (RPS)) to handle the protocol processing).

Accordingly, using RSS, no single virtual CPU 225 is loaded with processing all incoming packets for VNIC 226. In addition, the processing of packets is distributed to different virtual CPUs 225 at the VNIC 226 and at the beginning of the processing pipeline for the packets, therefore taking advantage of distributed processing of packets at an early stage in the processing pipeline.

In some embodiments, a VM 220 is configured to perform the functions of a TEP. For example, VM $220_1$ may be configured as a TEP and include a TEP component 250 implement TEP functions. VM $220_1$ is TEP 125 of FIG. 1 and henceforth is referred to as TEP 125. TEP component 250 refers to a set of instructions that configure TEP 125 to perform TEP functions. TEP 125 is also configured to implement IPSec protocols and functionality using an IPSec layer or component 252 ("IPSec 252"). More specifically, IPSec 252 encrypts outgoing packets destined for a certain destination TEP by encapsulating them with, for example, ESP headers based on a corresponding security association. In each packet's ESP header, IPSec 252 also includes an SPI value, associated with the security association, that is generated by the IKE layer or component 251 ("IKE 251") through an IKE negotiation performed between IKE 251 and an IKE component of a destination TEP associated with the destination EP. IPSec 252 is also configured to decrypt incoming encapsulated ESP encrypted data packets received from a source TEP. IKE 251 is responsible for performing IKE negotiations with IKE components of other network entities to generate encryption/decryption keys and SPI values.

Further, another VM 220 executing on host machine 200, or on another host, may be configured as an EP associated with TEP 125. For example, VM $220_2$ may be an EP associated with TEP 125. Accordingly, in some embodiments, another source EP may generate an IP packet to send to VM $220_2$. The source EP may forward the IP packet to a source TEP, which encrypts (e.g., using an IPSec component, similar to IPSec 252) and encapsulates (e.g., using a TEP component, similar to TEP component 250) the packet using an IPSec protocol (e.g., ESP tunnel mode) to generate an encapsulated ESP encrypted data packet. The source TEP then sends the encapsulated ESP encrypted data packet to destination TEP 125. The encapsulated ESP encrypted data packet is, therefore, received at virtual switch 214 of host machine 200 via PNIC 202. Virtual switch 214 sends the encapsulated ESP encrypted data packet to VNIC 226 of TEP 125.

As further described above, VNICs may be configured to perform RSS for received encapsulated ESP encrypted data packets based on the packets' SPI values. For example, VNIC 226 of TEP 125 receives an encapsulated ESP encrypted data packet, as described above. VNIC 226 then generates (e.g., computes) a hash value (e.g., CPU core ID) based at least in part on an SPI value included in the ESP header of the encapsulated ESP encrypted data packet. For example, VNIC 226 identifies the encapsulated ESP encrypted data packet as an ESP packet based on an IP protocol number in the header of the packet indicating it is an ESP packet (e.g., equal to 50), and therefore calculates the hash value based at least in part on the SPI value.

As discussed, each security association for a pair of EPs may have a different associated SPI value. For example, destination TEP 125 may use a first security association for packets sent from a first source EP via a source TEP for VM $220_2$, and a second security association for packets sent from a second source EP via the same source TEP for VM $220_2$. Accordingly, even though encapsulated ESP encrypted data packets may be received at destination TEP 125 from the same source TEP and therefore have the same source and destination IP addresses in the new header of each of the encapsulated ESP encrypted data packets, different hash values may be calculated for the packets based at least in part on the different SPI values. In some embodiments, the hash value is further computed based on the source and/or destination IP addresses in the new header, such as to add further entropy to the hash value calculation. Subsequently, VNIC 226 assigns the encapsulated ESP encrypted data packet to one of the plurality of VNIC RSS queues 227 based on the generated hash value.

However, as described above, in certain use cases, even if the VNIC is configured to perform RSS for received encapsulated ESP encrypted data packets, e.g., by taking into account the packets' SPI values when computing hash values, it is very unlikely that a relatively uniform distribution of packets to virtual CPUs results from the RSS. For example, VNIC 226 may receive, from a single source TEP, encapsulated ESP encrypted packets with four different SPI values, each associated with a different security association established between a source EP in the physical network and a destination EP (e.g., VM $220_2$) residing on host machine 200. However, the hash algorithm that is used by VNIC 226 may be configured such that the same hash value may be generated for all or most of the SPI values, which results in all or most of the packets being assigned to the same RSS queue 227. As a result, while hashing the SPI value improves distribution across RSS queues, especially when a relatively large number of IPsec channels are carried by the tunnel, configuring a VNIC 226 to perform RSS for encapsulated ESP encrypted data packets based on the packets' SPI values does not necessarily guarantee a reasonably fair and even distribution of the packets among virtual CPUs 225 unless there is a very large number of IPSec tunnels or many different security associations.

Accordingly, certain embodiments described herein relate to configuring a destination TEP with an ESP RSS mode to assign each incoming packet, received from a certain source EP through a source TEP, to a certain RSS queue 227 based on an identifier that is encoded in an SPI value included the packet. As described below, the identifier may be indicated by a certain number of bits in the SPI values. The identifier may identify an RSS queue number associated with an RSS queue associated with a certain virtual CPU 225. When received by the destination TEP, an incoming encapsulated ESP encrypted packet is examined by the destination TEP to determine which RSS queue 227 the packet should be assigned to based in part or entirely on the identifier in the SPI value. In some embodiments, the identifier is encoded in the SPI value during IPSec tunnel creation performed by the destination and source TEPs. The selection of an identifier is based on a selection of a virtual CPU 225. A virtual CPU 225 is selected by the destination TEP from the plurality of virtual CPUs based on a CPU selection function. One of a variety of CPU selection functions may be used to help ensure that incoming network traffic from different source EPs, through the source TEP, is evenly distributed among virtual CPUs 225.

Figure 3:
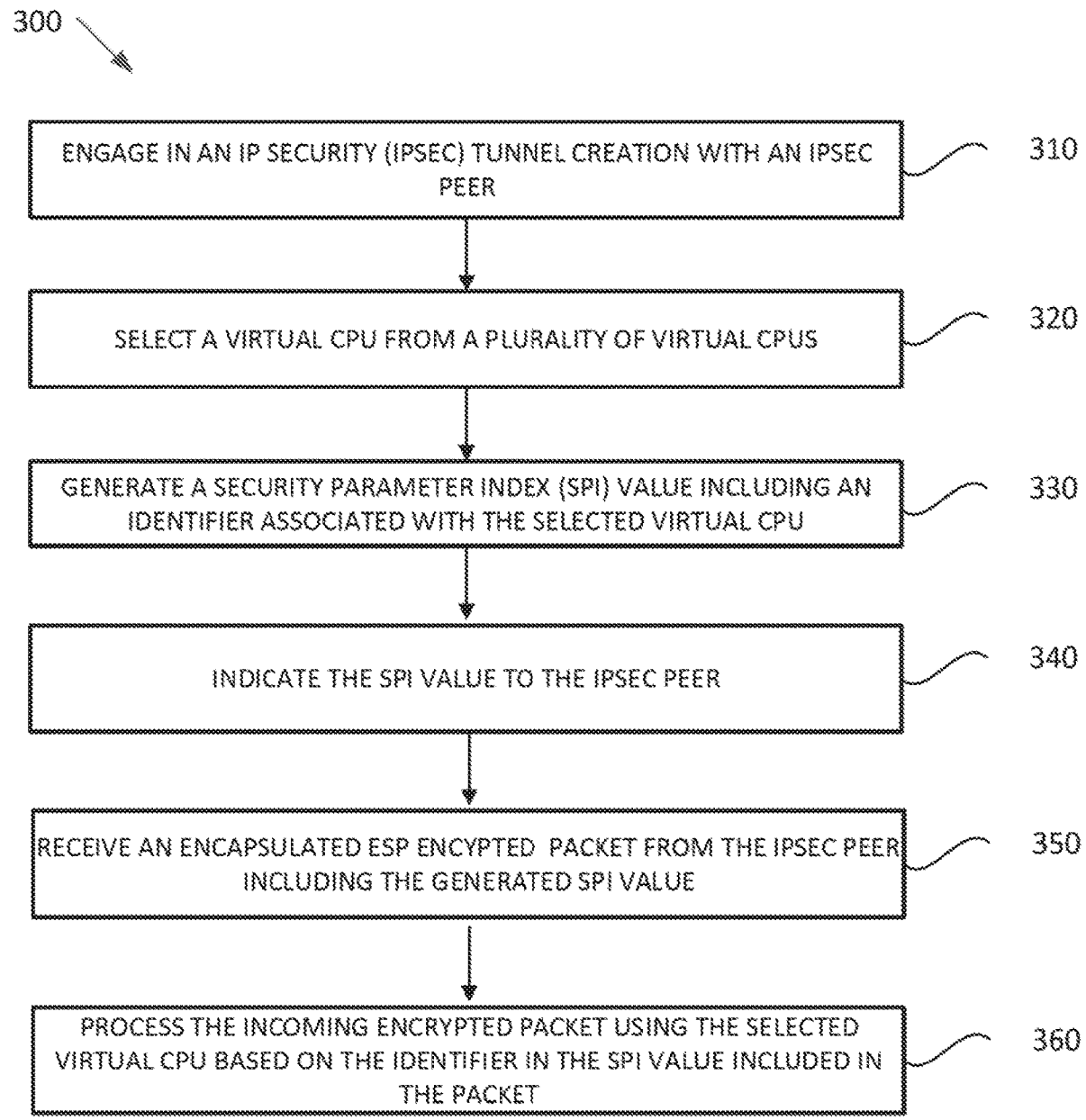
FIG. 3 illustrates example operations for use by a destination tunnel endpoint for establishing an IPSec tunnel with an IPSec peer, according to some embodiments.

FIG. 3 illustrates example operations 300 for use by a destination TEP to enable deterministic load balancing of IPSec processing, in accordance with some embodiments. In the example of operations 300, the destination TEP is TEP VM 220$_1$, which is TEP 125 of FIG. 1, the source TEP is TEP 115, the source EP is EP 110 and the destination EP is VM 220$_2$, which is EP 120 of FIG. 1. In other examples, the destination and source TEPs may be physical computing devices. TEP 125 and TEP 115 are also referred to as IPSec peers.

At block 310, the TEP 125 engages in IPSec tunnel creation with a TEP 115. For example, IPSec 252 of TEP 125 engages in IPSec tunnel creation with an IPSec component (with the same or similar capabilities as IPSec 252) executing on TEP 115. In some embodiments, IPSec tunnel creation may be triggered when network traffic is flagged for protection according to an IPSec security policy configured in the IPSec peers, such as TEP 125 and TEP 115 in the physical network. For example, TEP 115 may receive data packets from EP 110 that are flagged for protection and destined for EP 120. As a result, the IPSec component residing in TEP 115, engages in IPSec tunnel creation with an IPSec 252 residing in TEP 125 for any data packets intended to be communicated between EP 120 and EP 110. Note that IPSec tunnel creation is initiated if security associations are not already established for communication between EP 110 and EP 120. If security associations are already established for that communication, the IPSec component residing in TEP 115 finds a corresponding outbound security association and uses it to encrypt the outgoing packet destined for EP 120.

Once the tunnel creation starts, the two IPSec peers, TEP 125 and TEP 115, begin the two-phase Internet Key Exchange (IKE) process, as described above, using their IKE components. For example, during IKE Phase I, IKE 251 residing in TEP 125 and the IKE component of TEP 115 ("the peer IKE component") communicate to authenticate and establish a secure channel between themselves to enable IKE Phase II. Once a secure channel between the two IKE components is established, during IKE Phase II, IKE 251 and the peer IKE component negotiate and establish two unidirectional IPSec security associations for communication between the EP 110 and EP 120. As described above, each security association includes a unique SPI value for enabling the IPSec peers to distinguish between security associations. For example, one security association (referred to as an "in-bound security association" in the embodiments described herein) may be established for encrypting data packets transmitted by EP 110 and destined for EP 120 while another security association ("outbound security association") may be established for encrypting data packets transmitted by EP 120 and destined for EP 110.

At block 320, the TEP 125 selects a virtual CPU from a plurality of virtual CPUs for processing packets originating from EP 110 and received through TEP 115. For example, in some embodiments, IKE 251 selects a virtual CPU from the plurality of virtual CPUs 225 to process all the future incoming encapsulated ESP encrypted packets received from TEP 115 and associated with traffic originated from EP 110. The corresponding in-bound security association that is created later, as described further below, is then assigned to the selected virtual CPU 225. When selecting a virtual CPU 225, IKE 251 utilizes a CPU selection function that is configured to enable a more even distribution of the load level being handled by virtual CPUs 225. Note that, in some embodiments, IKE 251 identifies virtual CPUs 225 by their corresponding CPU core IDs. As such, in such embodiments, selecting a virtual CPU 225 refers to a selection of a CPU core ID associated with the virtual CPU 225.

In one example, the CPU selection function comprises a round-robin algorithm for selecting virtual CPUs 225. To illustrate this with an example, TEP 125 may include four virtual CPUs 225. In such an example, the selection process may start by IKE 251 selecting the first virtual CPU, then the second, third, and fourth, and then back to the first virtual CPU, and so on, in a continuous loop. IKE 251 assigns a different in-bound security association to each selected virtual CPU 225. Using this approach helps with evenly distributing security associations to virtual CPUs 225.

In another example, the CPU selection function takes into account the number of in-bound security associations assigned to each virtual CPU. In such an example, IKE 251 maintains a count of in-bound security associations that are assigned to each virtual CPU. When a security association is assigned to a certain virtual CPU 225, IKE 251 increments the security association count ("SA count") associated with the virtual CPU 225. The CPU selection function is, therefore, configured to select virtual CPUs 225 based on their corresponding SA counts. For example, the CPU selection function may be configured to select the virtual CPU with the lowest SA count. In certain embodiments, when two or more virtual CPUs 225 have the same lowest SA count, CPU selection function may be configured to use a round-robin approach in selecting the next virtual CPU. Using a function that takes into account the SA count associated with each of the virtual CPUs 225 is advantageous because security associations may be removed sometime after being assigned. For example, three security associations may be assigned to each of the four virtual CPUs 225. However, after a while, one or more of the three security associations assigned to one of the virtual CPUs 225 may be removed, in which case it is advantageous to assign the next upcoming security association to that virtual CPU, thereby distributing security associations among virtual CPUs 225 in a more even fashion.

In yet another example, the CPU selection function takes into account the CPU utilization of virtual CPUs 225. For example, the CPU selection function may be configured to select a virtual CPU based on the latest average CPU utilization of the virtual CPUs, such as by selecting the virtual CPU with the lowest CPU utilization. In one example, IKE 251 receives the CPU utilization information associated with virtual CPUs 225 from IPSec 252 (e.g., through a communication channel established between the two components). The CPU utilization information of a virtual CPU 225 may include average CPU utilization of the virtual CPU 225 over a defined period of time.

Figure 4:
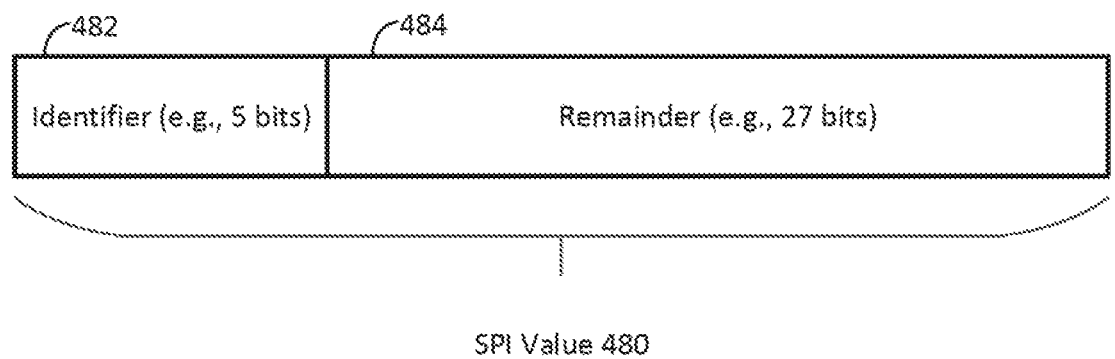
FIG. 4 illustrates an example SPI value including an identifier and a remainder, according to some embodiments.

At block 330, TEP 125 generates an SPI value by including an identifier associated with an RSS queue associated with the virtual CPU, selected at block 320, in the SPI value. For example, IKE 251 generates an SPI value that includes an identifier associated with the RSS queue associated with the selected virtual CPU. FIG. 4 illustrates an example SPI value 480 including an identifier 482 (e.g., 5 bits) and a remainder 484 (e.g., 27 bits). As shown, identifier 482 makes a portion of SPI value 480.

In one example, the identifier is an RSS queue number associated with an RSS queue, from RSS queues 227, that is associated with the selected virtual CPU. Including an RSS queue number in the SPI value helps ensure that the corresponding incoming packets, when received at TEP 125, are placed by VNIC 226 in the corresponding RSS queue 227 and are then processed by the selected virtual CPU 225. As described in further detail below, in some embodiments, VNIC 226 is configured with an ESP RSS mode, which enables VNIC 226 to examine and assign packets to different RSS queues 227 based on the identifiers in their corresponding SPI values.

In embodiments where the identifier is an RSS queue number, IKE 251 may be provided with access to or store a mapping of RSS queue numbers of RSS queues 227 to CPU core IDs of the virtual CPUs 225. This is to enable IKE 251 to identify the RSS queue 227 that is associated with the CPU core ID of the selected virtual CPU. In some embodiments, IPSec 252 provides this mapping to IKE 251. In certain embodiments, the mapping is an array where the array index numbers correspond to the CPU core IDs and the elements of the array indicate RSS queues numbers. As such, after selecting a virtual CPU 225 at block 320, IKE 251 refers to the mapping to identify the corresponding RSS queue number and then encodes the RSS queue number in the SPI value.

Encoding an RSS queue number into an SPI value may involve replacing n bits of the total number of bits in the SPI value with the n bits that represent the RSS queue number. For example, the IPsec standard calls for an SPI value being generated with 32 bits. In one embodiment, each RSS queue number may be 5 bits, which can specify up to 32 different RSS queues. In such an example, encoding an RSS queue number into the SPI value involves replacing 5 bits of the 32-bit SPI value with the 5 bits of the RSS queue number. The 5-bit RSS queue number may be inserted anywhere in the 32-bit SPI value and can be either non-contiguous or contiguous. The rest of the SPI value (e.g., the 27 bits) may include random bits. For efficient processing though, keeping the 5-bit RSS queue number contiguous is advantageous. Also, it may be more efficient to set the 5-bit RSS queue number at the most significant, or least significant bits of the SPI value. Note that the RSS queue number and the SPI value may have more or less than 5 bits and 32 bits, respectively, and that the number of bits used here are merely exemplary. Also note that encoding an RSS queue number into an SPI value may involve generating a number of random bits and then combining the random bits with the bits associated with the RSS queue number. For example, instead of generating a 32 bit SPI value and then replacing n bits with n bits of the RSS queue number, IKE 251 may generate 27 random bits and combine the n bits of the RSS queue number with those 27 random bits, thereby obtaining a 32 bit SPI value.

IKE 251 uses the generated SPI value, including the identifier, to establish an in-bound security association between the source EP and destination EP (e.g., EP 110 and EP 120, respectively). The in-bound security association is used by IPSec 252 at TEP 125 to encrypt packets transmitted by EP 110 and destined for EP 120.

At block 340, TEP 125 indicates the SPI value generated at block 330 to TEP 115 for use in an in-bound security association utilized to encrypt data packets transmitted by the EP 110 and destined for VM 220₂. For example, IKE 251 indicates the generated SPI value to the peer IKE at TEP 115 for use in an in-bound security association utilized to encrypt data packets transmitted by EP 110 and destined for destination EP 120. After the security association is established with the generated SPI value, the IPSec component at TEP 115 encrypts any packets received from EP 110 and destined for EP 120 using the in-bound security association and the generated SPI value. Note that because TEP 125 independently generates the SPI value for use in incoming packets that are originated at EP 110 and encrypted by TEP 115, TEP 115 does not have to be aware or be able to determine that the SPI value includes an identifier associated with an RSS queue associated with a virtual CPU 225 at TEP 125. For additional information relating to SPI value generation, please refer to Request for Comments (RFC) section 2409.

At block 350, TEP 125 receives an encrypted incoming packet from TEP 115. The encapsulated ESP encrypted incoming packet includes the SPI value generated at block 330. For example, VNIC 226 of TEP 125 receives the encapsulated ESP encrypted packet from TEP 115.

At block 360, TEP 125 processes the encapsulated ESP incoming encrypted packet using the selected virtual CPU based on the identifier that is encoded in the SPI value included in the packet. For example, after receiving the encapsulated ESP encrypted packet, VNIC 226 stores the packet in a certain RSS queue 227 based on the identifier in the SPI value of the packet. The identifier, as described above, may be an RSS queue number. A thread 229 at TEP 125 that is scheduled on the selected virtual CPU 225 then accesses the packet in the RSS queue 227, based on a mapping between RSS queue number 227 and virtual CPUs 225. In some embodiments, VNIC 226 is configured with an ESP RSS mode that is different from the existing RSS mode, which uses hashing to assign packets to RSS queues 227. The ESP RSS mode configures VNIC 226 to examine packets and determine if they are ESP encrypted. If yes, the ESP RSS mode further directs VNIC 226 to store the ESP encrypted packets to RSS queues 227 based on the identifier included in the packets' SPI values.

In embodiments where IKE 251 is configured to encode RSS queue numbers into SPI values, the ESP RSS mode configures VNIC 226 to store each packet in an RSS queue 217 based on a corresponding RSS queue number in the packet's SPI value. If the ESP RSS mode determines that an incoming packet is not ESP encrypted, then the packet is passed by the ESP RSS mode to the existing RSS mode of VNIC 226 in order to assign the packet to an RSS queue 227 using a hashing function, as described above.

By utilizing the operations described above in relation to FIG. 3, IKE 251 is able to deterministically select a virtual CPU for processing encapsulated ESP encrypted packets associated with a certain in-bound security association (e.g., a certain pair of source and destination EPs). This also ensures that encapsulated ESP encrypted packets from the same flow are not processed out of order because they all include the same SPI value in their headers and, therefore, are assigned to and processed by the same virtual CPU. Note that the computer architecture shown in FIG. 2 of the present disclosure is merely provided as an example and that operations 300 of FIG. 3 can be performed by a destination TEP that includes a physical computing device with physical CPUs.

It is important to note that, typically, to add an extra level of security, the IPSec framework may require that security associations between EPs change periodically (e.g., after a certain amount of time, after a certain amount of data has been exchanged, etc.), meaning that the SPI values associated with the changing security associations change periodically as well. In such situations, after determining that an SPI value associated with a certain security association needs to be changed, IKE 251 may either use the same identifier, previously used for the in-bound security association, or use a new identifier when generating the new SPI value. If IKE 251 is configured to use the same identifier (e.g., same RSS queue number), then IKE 251 only performs operations 330 and 340 to generate and indicate the new SPI value to TEP 115. Using the same identifier ensures that all the packets transmitted using the same in-bound security association are not processed out of order because they would be assigned to and processed by the same virtual CPU.

If, however, IKE 251 is configured to use a new identifier, then IKE 251 undergoes operations 320-340 to select a virtual CPU, generate a new SPI value, including a new identifier associated with an RSS queue associated with the selected virtual CPU, and indicate the new SPI value to TEP 115. Note that even if IKE 251 is configured to generate a new identifier, the new identifier may still be the same as the previously used identifier because IKE 251 may select the same corresponding virtual CPU due to, for example, the virtual CPU having the lowest CPU utilization.

In some embodiments, instead of performing IKE with an IPSec peer when engaging in IPSec tunnel creation, IPSec 252 may receive an encryption/decryption key as well as an SPI value from a DNE controller (e.g., server 140). For example, the DNE controller may select a virtual CPU, generate an SPI value including an identifier associated with an RSS queue associated with the virtual CPU, as described above in relation to blocks 320-330 of FIG. 3, and subsequently transmit the SPI value to both TEP 125 and TEP 115 for use in establishing the in-bound security association utilized for encrypting packets transmitted from EP 110 to EP 120. In some embodiments, the DNE controller may have access to a CPU selection function as well as information that enables the DNE controller to select a virtual CPU. For example, the DNE controller may receive information about the level of load each virtual CPU of virtual CPUs 225 is handling or keep track of how many SAs are assigned to each virtual CPU at any point in time.

In host machine 200, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a floppy disk, flash drive, etc.) as the permanent storage device Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for deterministic load balancing of processing received encapsulated encrypted data packets at a destination tunnel endpoint (TEP), comprising:
   engaging in a tunnel creation according to a security protocol with a source TEP for encrypting data packets communicated between a source endpoint and a destination endpoint;
   selecting a central processing unit (CPU) from a plurality of CPUs of the destination TEP using a CPU selection function, the selected CPU being selected to process packets communicated over the tunnel from the source TEP to the destination TEP;
   determining a receive side scaling (RSS) queue number associated with an RSS queue associated with a CPU core identifier (ID) of the selected CPU;
   generating a security parameter index (SPI) value including the RSS queue number;
   indicating the SPI value to the source TEP;
   establishing an in-bound security association with the source TEP using the SPI value;
   receiving an encrypted packet from the source TEP, wherein:
      the encrypted packet is encrypted by the source TEP based on the in-bound security association; and
      the encrypted packet includes the SPI value;
   retrieving the encrypted packet from the RSS queue having the RSS queue number; and
   processing the encrypted packet using the selected CPU.

2. The method of claim 1, wherein the CPU selection function uses a CPU utilization level of each of the plurality of CPUs as input.

3. The method of claim 1, wherein the CPU selection function uses a security association count of each of the plurality of CPUs as input.

4. The method of claim 1, wherein the CPU selection function uses a round-robin algorithm.

5. The method of claim 1, wherein the RSS queue number is a first number of bits of the SPI value, and wherein remaining bits of the SPI value represent a value.

6. The method of claim 1, wherein generating the SPI value further comprises:
   generating a second SPI value; and
   replacing a number of bits in the second SPI value with bits of the RSS queue number to generate the SPI value.

7. The method of claim 1, wherein receiving the encrypted packet from the source TEP comprises:
   receiving the encrypted packet using a virtual network interface card (VNIC), the encrypted data packet comprising a first header and an encrypted payload, the first header comprising a source IP address of the source TEP, a destination IP address of the destination TEP, and the SPI value corresponding to the in-bound security association, the encrypted payload comprising a second header comprising a source IP address of the source endpoint and a destination IP address of the destination endpoint;
   determining, at the VNIC, that the encrypted packet is an encapsulating security payload (ESP) encrypted packet;
   determining, at the VNIC, that the encrypted packet is associated with the RSS queue based on the RSS queue number identifier; and
   using, at the VNIC, an ESP RSS mode of the VNIC to store the encrypted packet in the RSS queue based on the RSS queue number.

8. A computer system, comprising:
   a memory comprising executable instructions; and
   a processor in data communication with the memory and configured to execute the instructions to cause the computer system to perform operations including:
      engaging in a tunnel creation according to a security protocol with a source tunnel endpoint (TEP) for encrypting data packets communicated between a source endpoint and a destination endpoint;
      selecting a central processing unit (CPU) from a plurality of CPUs of a destination TEP using a CPU selection function, the selected CPU being selected to process packets communicated over the tunnel from the source TEP to the destination TEP;
      determining a receive side scaling (RSS) queue number associated with an RSS queue associated with a CPU core identifier (ID) of the selected CPU;

generating a security parameter index (SPI) value including the RSS queue number;

indicating the SPI value to the source TEP;

establishing an in-bound security association with the source TEP using the SPI value;

receiving an encrypted packet from the source TEP, wherein:
- the encrypted packet is encrypted by the source TEP based on the in-bound security association; and
- the encrypted packet includes the SPI value;

retrieving the encrypted packet from the RSS queue having the RSS queue number; and processing the encrypted packet using the selected CPU.

9. The computer system of claim 8, wherein the CPU selection function uses a CPU utilization level of each of the plurality of CPUs as input.

10. The computer system of claim 8, wherein the CPU selection function uses a security association count of each of the plurality of CPUs as input.

11. The computer system of claim 8, wherein the CPU selection function uses a round-robin algorithm.

12. The computer system of claim 8, wherein the RSS queue number is a first number of bits of the SPI value, and wherein remaining bits of the SPI value represent a value.

13. The computer system of claim 8, wherein generating the SPI value further comprises:

generating a second SPI value; and replacing a number of bits in the second SPI value with bits of the RSS queue number to generate the SPI value.

14. The computer system of claim 8, wherein receiving the encrypted packet from the source TEP comprises:

receiving, at the destination TEP, the encrypted packet using a virtual network interface card (VNIC), the encrypted data packet comprising a first header and an encrypted payload, the first header comprising a source IP address of the source TEP, a destination IP address of the destination TEP, and the SPI value corresponding to the in-bound security association, the encrypted payload comprising a second header comprising a source IP address of the source endpoint and a destination IP address of the destination endpoint;

determining, at the VNIC of the destination TEP, that the encrypted packet is an encapsulating security payload (ESP) encrypted packet;

determining, at the VNIC of the destination TEP, that the encrypted packet is associated with the RSS queue based on the RSS queue number; and using, at the VNIC, an ESP RSS mode of the VNIC to store the encrypted packet in the RSS queue based on the RSS queue number.

15. A non-transitory computer readable medium having instructions stored thereon that, when executed by a computer system, cause the computer system to perform operations comprising:

engaging in a tunnel creation according to a security protocol with a source tunnel endpoint (TEP) for encrypting data packets communicated between a source endpoint and a destination endpoint;

selecting a central processing unit (CPU) from a plurality of CPUs of a destination TEP using a CPU selection function, the selected CPU being selected to process packets communicated over the tunnel from the source TEP to the destination TEP;

determining a receive side scaling (RSS) queue number associated with an RSS queue associated with a CPU core identifier (ID) of the selected CPU;

generating a security parameter index (SPI) value including the RSS queue number;

indicating the SPI value to the source TEP;

establishing an in-bound security association with the source TEP using the SPI value;

receiving an encrypted packet from the source TEP, wherein:
- the encrypted packet is encrypted by the source TEP based on the in-bound security association; and
- the encrypted packet includes the SPI value;

retrieving the encrypted packet from the RSS queue having the RSS queue number; and processing the encrypted packet using the selected CPU.

16. The non-transitory computer readable medium of claim 15, wherein the CPU selection function uses a CPU utilization level of each of the plurality of CPUs as input.

17. The non-transitory computer readable medium of claim 15, wherein the CPU selection function uses a security association count of each of the plurality of CPUs as input.

18. The non-transitory computer readable medium of claim 15, wherein the CPU selection function uses a round-robin algorithm.

* * * * *